United States Patent [19]

Oslapas et al.

[11] Patent Number: 4,987,963

[45] Date of Patent: Jan. 29, 1991

[54] STEERING GEAR FOR THE ROADWHEELS OF A VEHICLE

[75] Inventors: Algis Oslapas, Dearborn Heights; Manfred Rumpel, Birmingham, both of Mich.

[73] Assignee: Ford Motor Company, Dearborn, Mich.

[21] Appl. No.: 290,541

[22] Filed: Dec. 27, 1988

[51] Int. Cl.$^5$ .............................................. B62D 5/04
[52] U.S. Cl. .................................... 180/79.1; 280/91; 74/388 PS
[58] Field of Search ................. 180/79.1, 148; 280/91; 74/388 PS

[56] References Cited

U.S. PATENT DOCUMENTS

| | | | |
|---|---|---|---|
| 1,281,428 | 10/1918 | Stout | 180/79.1 |
| 4,582,334 | 4/1986 | Tashiro et al. | 280/91 |
| 4,593,781 | 6/1986 | Galtier | 180/79.1 |
| 4,652,002 | 3/1987 | Kurokawa et al. | 180/79.1 |
| 4,695,069 | 9/1987 | Kurokawa et al. | 280/91 |

Primary Examiner—Richard A. Bertsch
Assistant Examiner—Mitchell Bampey
Attorney, Agent, or Firm—Jerome R. Drouillard; Roger L. May

[57] ABSTRACT

A steering gear and system for a vehicle having steerable roadwheels located on more than one axle includes a control module, a rotary motor responsive to signals from the control module for providing power for steering the roadwheels, and a nonreversible gearset powered by the motor for converting rotary motion of the motor into linear motion for steering the roadwheels, with the motor being capable of driving the gearset but with the gearset being incapable of driving the motor in response to force inputs from the roadwheels into the gearset.

5 Claims, 4 Drawing Sheets

STEERING GEAR FOR THE ROADWHEELS OF A VEHICLE

BACKGROUND OF THE INVENTION

1. Field of the Invention

This invention relates to a steering gear and steering system for operating the roadwheels of a vehicle, particularly the rear wheels of a vehicle normally employing front wheel steering.

2. Disclosure Information

Multiple axle steering systems typically in use in automotive vehicles employ a main steering gear for providing gross steering inputs at either the front or rear of the vehicle. A secondary steering gear for providing minor steering inputs to the roadwheels of the opposing axle is the subject of the present invention. It has been determined that undesirable handling characteristics will result if the auxiliary steering system is capable of being backdriven. As used herein, the term "backdriven" means that the steered roadwheel may be rotated about its kingpin axis in response to side forces caused by steering maneuvers, road roughness, braking, acceleration, or other types of inputs into the roadwheels. As used herein, the term "nonreversible" means a steering gear and system which cannot be backdriven. This backdrive phenomenon is objectionable insofar as it detracts from the ability to control the steering angle of the affected roadwheel. In shaft-type four-wheel steer systems such as that exemplified by U.S. Pat. No. 4,582,334, in which a rotatable shaft couples the front and rear steering gears of the vehicle, the backdrive phenomenon may cause the steering wheel to oscillate in the driver's hands. In other known four wheel steering systems, springs are used for centering the rear steering gear so as to resist reversibility. This will increase the amount of power required for operating the steering gear. In other types of electronically controlled systems such as that illustrated in U.S. Pat. No. 4,695,069, the backdrive phenomenon may cause the motor powering the system to rotate in response to the backdrive force when no rotation was called for by the system control module. A further problem noted with the system of the '069 patent resides in the fact that the rear steering gear is resiliently coupled to the roadwheel. This resilient coupling will allow compliance steering of the roadwheel which will undermine the ability of the steering system to control the steered attitude of the wheel.

It is an object of the present invention to provide a steering gear and steering system suitable for use as an auxiliary steering system—e.g. at the rear of a normally front-steered vehicle, which will provide precise control of the steered roadwheels.

It is yet another object of the present invention to provide a rear wheel steering system which cannot be backdriven.

Other objects, features and advantages of the present invention will become apparent to the reader of this specification.

SUMMARY OF THE INVENTION

In accordance with this invention a steering gear for steering the roadwheels of a vehicle comprises a control module, a rotary motor, responsive to signals from such control module, for providing power for steering said roadwheels, and a nonreversible gearset, powered by said motor, for converting rotary motion of the motor into linear motion for steering the roadwheels. Because the gearset is nonreversible, the motor is capable of driving the gearset in either direction, but the gearset is incapable of driving the motor in response to force inputs from the roadwheels into the gearset. In one embodiment, the nonreversible gearset comprises a motor pinion attached to a rotating shaft driven by the motor, a face gear driven by the motor pinion, a rack pinion coupled to the face gear, and a slidable rack driven by the rack pinion, with each end of the rack being operatively attached to a steerable spindle upon which a roadwheel is journaled. The motor pinion tooth design and ratio are set preferably such that the backdriving force components cannot overcome the friction of the gearset. In a second embodiment, the nonreversible gearset comprises a worm gear attached to a rotating shaft driven by the motor, a main drive gear driven by the worm gear, a drive nut driven by the main drive gear, and a lead screw driven by the drive nut, with each end of the lead screw being operatively attached to a steerable spindle upon which a roadwheel is journaled. The drive nut may comprise a ball nut having a plurality of spherical bodies interposed between the nut and the lead screw. In both embodiments, the rack or lead screw as the case may be will be operatively attached by means of an inextensible joint to a steerable spindle upon which one of the roadwheels is journaled. Alternatively, a roller nut or other type of friction reducing nut and screw combination may be utilized.

DESCRIPTION OF THE PREFERRED EMBODIMENTS

Figure 1:
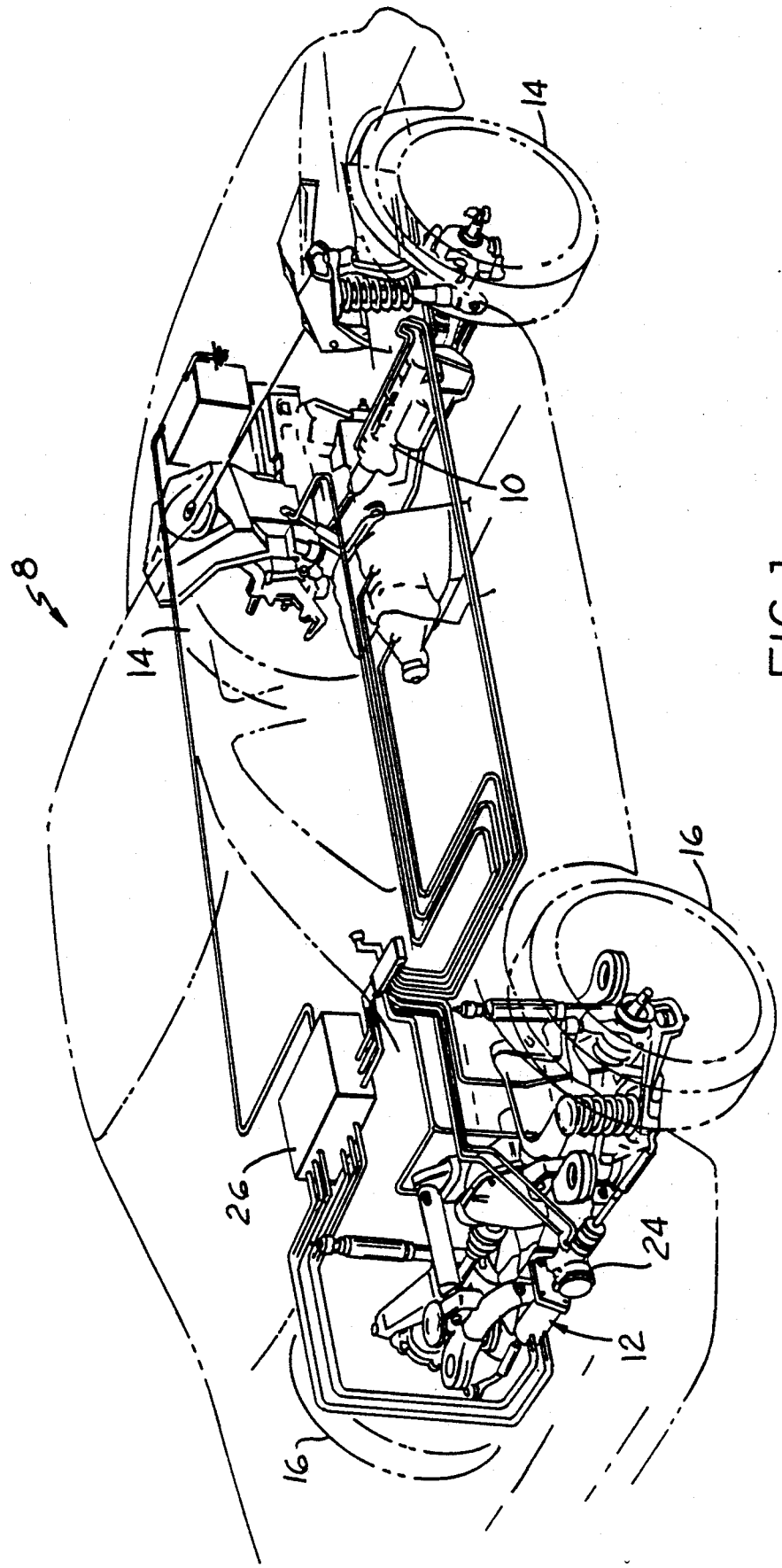
FIG. 1 is a phantom perspective view of a vehicle having a steering syStem according to the present invention.

As shown in FIG. 1, a vehicle, 8, equipped with the present invention has front and rear steerable roadwheels 14 and 16, respectively. Those skilled in the art will appreciate in view of this disclosure that a system according to the present invention could be applied to vehicles having steerable roadwheels on more than two axles. Similarly, a system according to the present invention could be employed at either the front or rear of a vehicle. A system according to the present invention includes, inter alia front steering gear 10 and rear steering gear, 12, which steer the front and rear roadwheels, 14 and 16, respectively. Rear steering gear 12 is operated by control module 26.

Figure 2:
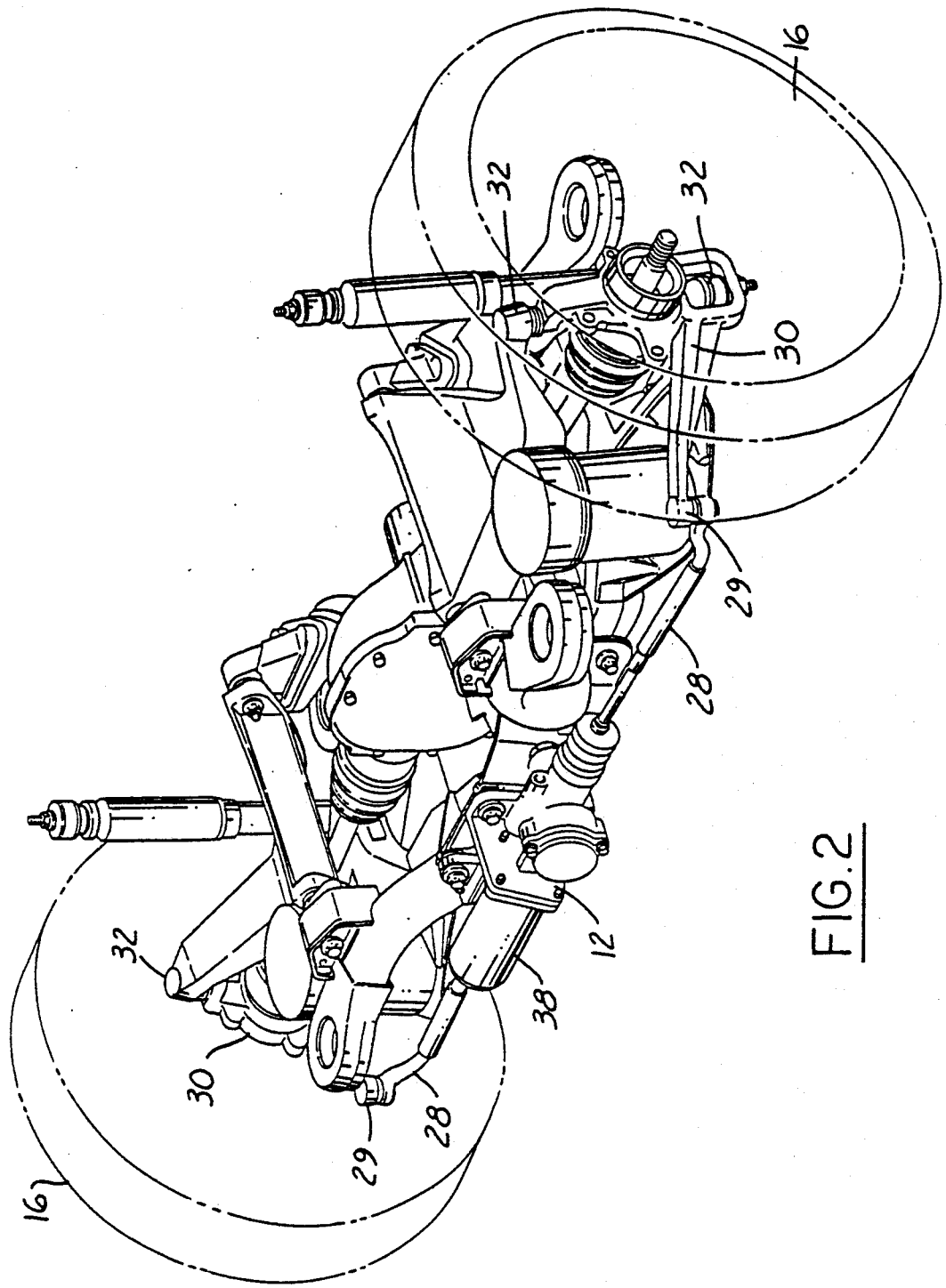
FIG. 2 is a perspective view of a rear wheel steering system according to the present invention.

FIG. 2 shows additional details of a system according to the present invention. Rear steering gear 12 is coupled to the roadwheel support system by means of tie-rods 28 which extend from the steering gear. At the outboard ends of each tierod, joint 29, comprising an inextensible ball joint, couples the tierod to spindle 30. Each spindle is rotatably mounted to upper and lower control arms by means of ball joints 32. In conventional practice, one roadwheel, 16, is journaled upon each spindle. Because joints 29 are inextensible, the joints will prevent relative movement from occurring between tierods 28 and spindles 30. As a result, compliance steering is avoided.

Figure 3:
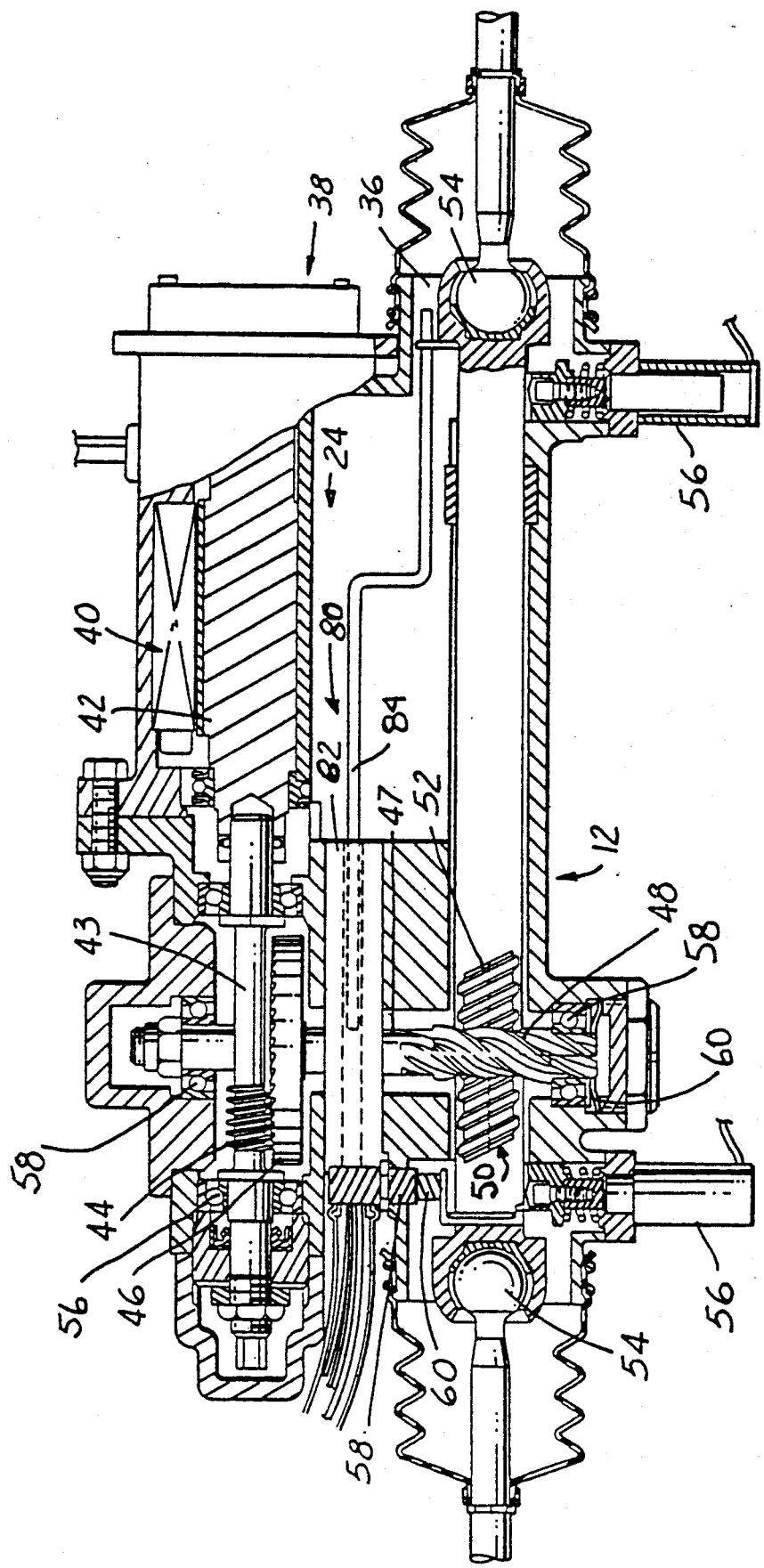
FIG. 3 is a cutaway view of a first embodiment of a rear steering gear according to the present invention.

FIG. 3 illustrates a first embodiment of a steering gear according to the present invention. Motor 38 having stator windings 40 and armature 42, drives motor pinion 44 by means of motor shaft 43. Motor pinion 44 comprises a spiroid gear having a lead angle of approximately seven degrees. It has been found that a gear having a lead angle of seven degrees, eight minutes, will provide the nonreversible feature of the present steering gear when combined with a face gear, 46, having pressure angles of 10 degrees and 27 degrees, respectively. Those skilled in the art will appreciate in view of this disclosure that other combinations of gear angles may be employed for achieving the nonreversibility taught by this invention. Face gear 46 is mounted upon pinion shaft 47, which has rack pinion 48 integral therewith. Pinion shaft 47 is supported by bearings 58 at either end and is axially preloaded by means of Belleville springs 60. Rack pinion 48 drives rack 50 which has teeth 52 formed therein. Inner tierod ends 54 couple tierods 28 to rack 50. In response to commands from control module 26, armature 42 of motor 38 will rotate and the rotational motion of the armature will be passed through motor pinion 44, face gear 46, rack pinion 48, and teeth 52 into rack 50, with the result that tierods 28 will be caused to move laterally in one direction or the other, thereby steering rear roadwheels 16.

As noted above, the steering gear shown in FIG. 3 is nonreversible because of the lead angle configuration of motor pinion 44 and face gear 46. As a result, and further because joints 29 are inextensible, roadwheels 16 will be maintained at the precise steering angle set by control module 26. The control module will detect the angle at which rear roadwheels 16 are being operated by means of LVDT 80 comprising coil 82 and plunger 84. As shown in FIG. 3, the coil is mounted in a stationary position within steering gear 12, with plunger 84 mounted upon and movable with rack 50.

Figure 4:
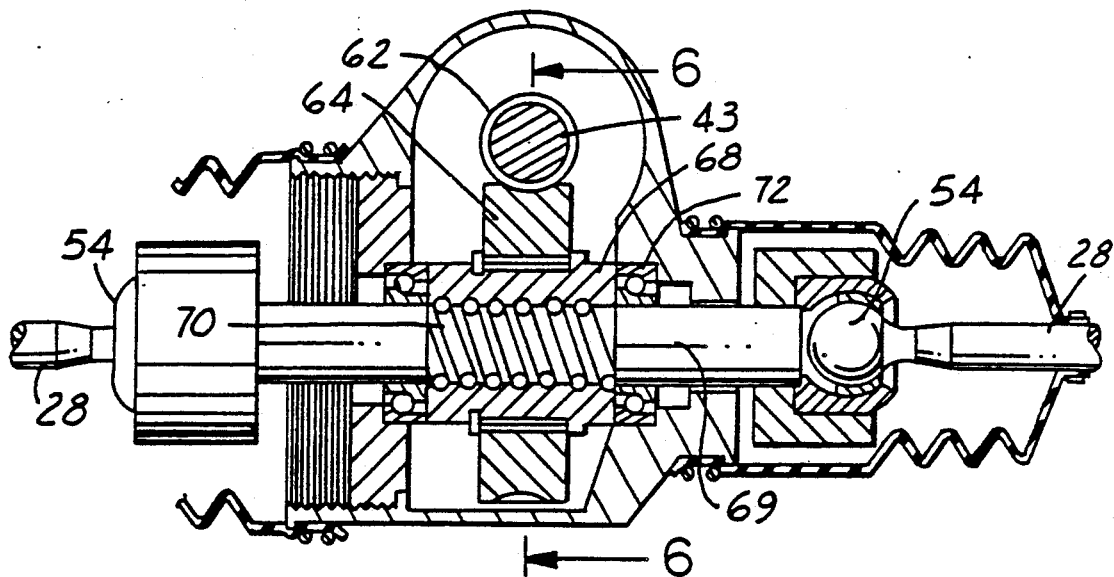
FIG. 4 is a cutaway fragmentary view of a second embodiment of a steering gear according to the present invention.
Figure 5:
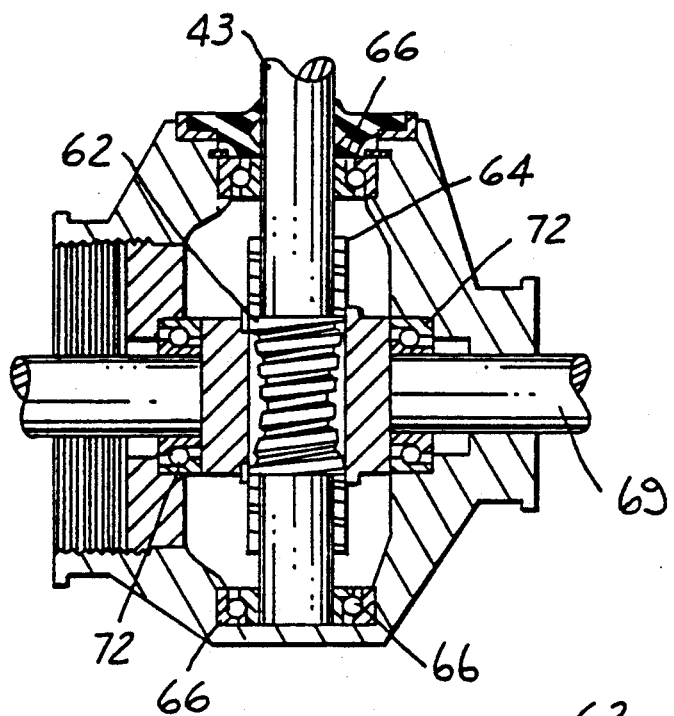
FIG. 5 is a fragmentary cutaway plan view of the steering gear shown in FIG. 4.
Figure 6:
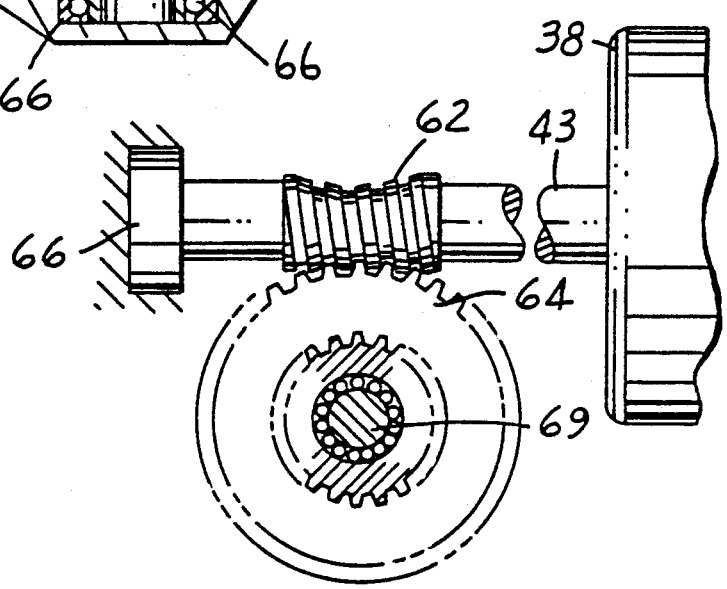
FIG. 6 is a fragmentary cutaway view of the steering gear of FIG. 4 taken along the line 6—6 of FIG. 4.

In the alternate embodiment shown in FIGS. 4, 5 and 6, motor shaft 43 drives a double-enveloping worm gear, 62, which, in turn, operates a main drive gear 64. A nut, 68, in this case comprising a ball nut, is mounted coaxially with main drive gear 64. The ball nut runs upon a threaded section 70 formed in lead screw 69. Accordingly, as motor shaft 43 rotates, lead screw 69 will be caused to move laterally of the vehicle, so as to move tie rods 28 laterally. As a result, roadwheels 16 will be steered as described before. It should be noted that a single-enveloping worm gear combination could be employed for practicing this invention.

Each embodiment of the present invention will allow precise control of the steering angle of the rear roadwheels, while preventing backdriving of the steering mechanism due to road loads resulting from stopping, starting, turning, or road imperfections. This will enable the control module to more accurately implement the steering control algorithm specified by the system designer.

It will be understood that the invention herein is not to be limited to the exact construction as shown and described and that various changes and modifications may be made without departing from the spirit and scope of the invention as defined by the appended claims.

We claim:

1. A steering gear for steering the roadwheels of a vehicle, comprising:
   a control module;
   a rotary motor, responsive to signals for said control module, for providing power for steering said roadwheels; and
   a nonreversible gearset, powered by said motor, for converting rotary motion of said motor into linear motion for steering said roadwheels, with said motor being capable of driving said gearset, but with said gearset being incapable of driving said motor in response to force inputs from said roadwheels into said gearset, said gearset comprising:
   a motor pinion attached to a rotating shaft driven by said motor;
   a face gear driven by said motor pinion;
   a rack pinion coupled to said face gear;
   a slidable rack driven by said rack pinion, with each end of said rack being operatively attached to a steerable spindle upon which a roadwheel is journaled;
   a worm gear attached to a rotating shaft driven by said motor;
   a main drive gear driven by said worm gear;
   a drive nut mounted coaxially with and driven by said main drive gear; and
   a lead screw driven by said drive nut, with each end of said lead screw being operatively attached to a steerable spindle upon which a roadwheel is journaled.

2. A steering gear according to claim 1, wherein said drive nut comprises a ball nut having a plurality of spherical bodies interposed between said nut and said lead screw.

3. A nonreversible steering system for steering the rear roadwheels of a vehicle, comprising:
   a control module;
   a rotary motor, responsive to signals from said control module, for providing power for steering said roadwheels; and
   a nonreversible gearset, powered by said motor, for converting rotary motion of said motor into linear motion for steering said roadwheels, with said gearset comprising:
   a motor pinion driven by said motor;
   a face gear driven by said motor pinion;
   a rack pinion coupled to said face gear; and
   a slidable rack driven by said rack pinion, with each end of said rack being operatively attached by means of an inextensible joint to a steerable spindle upon which one of said roadwheels is journaled.

4. A steering gear according to claim 3, wherein said motor pinion comprises a spiroid gear having a lead angle of approximately seven degrees and said face gear comprises a spiroid gear having pressure angles of approximately ten and twenty-seven degrees.

5. A nonreversible steering system for steering the rear roadwheels of a vehicle, comprising:
   a control module;
   a rotary motor, responsive to signals from said control module, for providing power for steering said roadwheels; and
   a nonreversible gearset, powered by said motor, for converting rotary motion of said motor into linear motion for steering said roadwheels, with said gearset comprising:
a motor pinion attached to a rotating shaft driven by said motor;
a face gear driven by said motor pinion;
a rack pinion coupled to said face gear;
a slidable rack driven by said rack pinion, with each end of said rack being operatively attached to a steerable spindle upon which a roadwheel is journaled;
a worm gear driven by said motor;
a main drive gear driven by said worm gear;
a drive nut driven by said main drive gear; and
a lead screw driven by said drive nut, with end of said lead screw being operatively attached by means of an inextensible joint to a steerable spindle upon which one of said roadwheels is journaled.

* * * * *